United States Patent
Farrell et al.

(10) Patent No.: US 11,964,300 B2
(45) Date of Patent: Apr. 23, 2024

(54) PROCESS AND DEVICE FOR QUICK DRY AND OR RAPID SET AQUEOUS EXTERNAL COATINGS

(71) Applicant: POLYGLASS S.p.A., Ponte di Piave (IT)

(72) Inventors: David Farrell, Deerfield Beach, FL (US); Robert Salars, Deerfield Beach, FL (US); Shawn Carney, Deerfield Beach, FL (US); Harold Sheldon Watkins, Deerfield Beach, FL (US); Betiana A. Acha, Deerfield Beach, FL (US); Ariel Lender, Deerfield Beach, FL (US); Louis L. Grube, Deerfield Beach, FL (US)

(73) Assignee: Polyglass S.p.A., Ponte di Piave (IT)

( * ) Notice: Subject to any disclaimer, the term of this patent is extended or adjusted under 35 U.S.C. 154(b) by 680 days.

(21) Appl. No.: 16/785,993

(22) Filed: Feb. 10, 2020

(65) Prior Publication Data
US 2020/0254481 A1    Aug. 13, 2020

Related U.S. Application Data

(60) Provisional application No. 62/803,044, filed on Feb. 8, 2019.

(51) Int. Cl.
*B05B 7/08* (2006.01)
*B05B 12/00* (2018.01)
(Continued)

(52) U.S. Cl.
CPC ............... *B05D 1/34* (2013.01); *B05B 7/08* (2013.01); *B05B 12/002* (2013.01); *B05B 15/20* (2018.02); *B05D 1/02* (2013.01)

(58) Field of Classification Search
CPC ......... B05B 7/08; B05B 15/20; B05B 12/002; B05D 1/24; B05D 1/02
(Continued)

(56) References Cited

U.S. PATENT DOCUMENTS 3,709,468 A * 1/1973 Ives .................. B01F 25/434
366/339
3,727,844 A * 4/1973 Bencic ............... B67D 1/0085
222/129
(Continued)

FOREIGN PATENT DOCUMENTS

WO    WO215/158588 A1    10/2015

OTHER PUBLICATIONS

U.S. Appl. No. 62/803,044, filed Feb. 8, 2019; first named inventor: David Farrell; Title: Technology for Quick Dry and or Rapid Set Aqueous External Coatings.

*Primary Examiner* — Chee-Chong Lee
(74) *Attorney, Agent, or Firm* — Rothwell, Figg, Ernst & Manbeck, P.C.

(57) ABSTRACT

A device and process for applying a quick dry rapid set aqueous solution. An indicator of a selected color and composition is added to an accelerator to be applied along with a resin. The tinted color indicator is typically blue and allows the user to determine if the proper mixture is being applied. The indicator is visible only during application and disappears after application. The resin and accelerator are applied using an airless spray mechanism with delivery systems and spray gun. The spray gun has 2 nozzles and the capability to set the angle between the nozzles.

27 Claims, 6 Drawing Sheets
(4 of 6 Drawing Sheet(s) Filed in Color)

(51) Int. Cl.
   *B05B 15/20*  (2018.01)
   *B05D 1/02*   (2006.01)
   *B05D 1/34*   (2006.01)

(58) Field of Classification Search
   USPC .......................................................... 239/418
   See application file for complete search history.

(56) References Cited

U.S. PATENT DOCUMENTS

| | | | | |
|---|---|---|---|---|
| 3,763,876 | A | * | 10/1973 | Freeman ............... B05B 7/1272 |
| | | | | 137/114 |
| 3,770,208 | A | * | 11/1973 | Mueller .............. B01F 25/3131 |
| | | | | 239/432 |
| 3,790,030 | A | * | 2/1974 | Ives ...................... B05B 7/1209 |
| | | | | 138/40 |
| 3,823,024 | A | | 7/1974 | Cogliano |
| 4,340,311 | A | * | 7/1982 | Crandal .................. B01F 23/47 |
| | | | | 138/42 |
| 4,386,992 | A | | 6/1983 | Takegawa |
| 4,571,415 | A | | 2/1986 | Jordan, Jr. |
| 4,618,098 | A | * | 10/1986 | Hedger, Jr. ........... B05B 7/0815 |
| | | | | 239/290 |
| 4,846,404 | A | * | 7/1989 | Smith ....................... B05B 7/08 |
| | | | | 239/432 |
| 5,186,388 | A | * | 2/1993 | Chapman ............. B29B 7/7452 |
| | | | | 239/420 |
| 5,219,914 | A | | 6/1993 | Warburton |
| 5,403,393 | A | | 4/1995 | Dubble |
| 2005/0143505 | A1 | | 6/2005 | Rosekelly |
| 2015/0140224 | A1 | | 5/2015 | Harco |

* cited by examiner

PROCESS AND DEVICE FOR QUICK DRY AND OR RAPID SET AQUEOUS EXTERNAL COATINGS

CROSS-REFERENCE TO RELATED APPLICATION

This non-provisional application claims priority from pending provisional Application No. 62/803,044 filed in the United States Patent and Trademark Office on Feb. 8, 2019.

BACKGROUND

Two part rapid set aqueous exterior coatings and caulks that can cure quickly to help alleviate, prevent or resist the exterior coating or caulk from being washed away, washed out and or ruined by sudden unexpected and inadvertent precipitation particularly rain showers have been available in the marketplace for years. Numerous formulation approaches have been employed to hasten the coagulation and or flocculation and or precipitation of the resin out of the aqueous solution in order to accelerate the cure time of the exterior aqueous coating or caulk particularly exterior aqueous coatings and caulks containing latex resin and or polymers are well known in the industry. This flocculation agent is often referred to as an accelerator and or catalyst in the industry.

Many different two part component systems have been disclosed for this purpose. Typically the first component of the two part system called "Part A" in this disclosure comprises an aqueous dispersion of water-insoluble latex polymer prepared by emulsion polymerization. Emulsion polymerization techniques are well known to the art, and are discussed in detail in D. C. Blackley, Emulsion Polymerization (Wiley 1975). Sridhar g. Iyer in International Patent Application Number WO215/158588 A1 goes to great lengths detailing all or most of the latex polymers, pigments and additives that can be used in Part A of the two component system. Part B of the second coating component usually comprises accelerators that flocculent and or coagulant and or precipitates the solids or semi-solids from the aqueous solution, such as the polymeric particles from a latex dispersion or impurities from water. In a rapid cure exterior coating system, Part B can coagulate the semi-solid or solid particles and or flocculate and or precipitate them quickly to ensure that a fast cure of the coating system will occur. It is the separation of the semi-solid or solid latex polymer components out of the aqueous water component that causes the exterior coating or caulk to cure rapidly. Standard exterior latex coating systems depend on evaporation of the water from the aqueous coating system in order for the coating to cure. Depending on weather conditions, humidity, etc. the dry time or cure rate can vary causing delays in application particularly if more than one application of coating is needed or wanted to increase the durability of the exterior coating.

Exemplary flocculants are well known in the art, for example Warburton U.S. Pat. No. 5,219,914 discloses that an organic quaternary amine resin, polyamide-epichlorohydrin that is cationic to be preferably sprayed together with the anionic roof mastic. Cogliano in U.S. Pat. No. 3,823,024 teaches that strong acids e. g. sulfuric, hydrochloric, phosphoric, etc., metallic ions, especially bivalent metallic ions e. g. calcium, magnesium, strontium, barium, zinc, etc. for coagulating an anionic latex. Takegawa U.S. Pat. No. 4,386,992 discloses charged polymers and multivalent metal salts, including suitable zinc, iron, calcium, and aluminum salts, Jordan in U.S. Pat. No. 4,571,415 teaches water soluble salt of zinc ammonium complex ion and Dubble in U.S. Pat. No. 5,403,393 discloses the use of a propionic acid salt of calcium. In each of these examples the second coating component comprises an effective amount of an accelerator and or flocculent and or coagulant and or means to precipitate the semi-solid or solid latex particles of the first coating component when combined together with the first coating component causing the coating to set more quickly.

Harco in US Patent No. 2015/0140224 A1 discloses a spray system for applying the first component containing the latex polymer and the second component containing an accelerator, i.e. a coagulant and or flocculent to precipitate the semi-solid or solid particles from the aqueous solution by means of a spray gun having first and second nozzles, a first pump fluidly connected between the first nozzle and a resin solution reservoir for delivering the resin solution to the first nozzle at a first fluid pressure, and a second pump fluidly connected between the second nozzle and an accelerator solution reservoir for delivering the accelerator solution to the second nozzle at a second fluid pressure different from the first pressure. The accelerator solution may be aerated by a source of compressed air prior to discharge from the second nozzle.

Harco also discloses a further aspect of the invention, a method for applying a coating includes providing a spray gun with first and second nozzles; discharging a resin solution from the first nozzle at a first fluid pressure; discharging an accelerator solution from the second nozzle at a second fluid pressure; combining the discharged resin solution with the discharged accelerator solution before application to the surface; and substantially curing the combined resin and accelerator solutions before application to the surface.

Harco further teaches that low viscosity components are preferred and during application of the coating to a surface, the delivery system preferably combines the resin solution and the accelerator solution during spraying such that the resin to accelerator spray ratio is in the range of about 15:1 to 1:0, and more preferably in the range of 15:1 to 10:1. A greater amount of accelerator results in a shorter curing time, while a lesser amount results in a longer curing time. Accordingly, the coating delivery system of the present invention permits adjustment of the spray ratio of resin to accelerator over a wide range of values.

Warburton U.S. Pat. No. 5,219,914 discloses that the means of applying Part A roof mastic and Part B, the flocculating agent are preferably simultaneously applied to the substrate. In one embodiment, the flocculating agent and the roof mastic are each sprayed as converging or overlapping streams and mix in the state of mist as they are applied to the substrate. The particular spraying machine used to apply the coating in this embodiment is not critical and includes any machine that can spray both the flocculating agent and the roof mastic formulation so that the spraying areas overlap. For example two spray guns can be used if they are regulated so that both spraying areas overlap, or a spray gun having two spray nozzles (e. g., Binks Model 69GW plural component spray gun, Binks Manufacturing Co., Franklin Park, Illinois). Alternatively, both the flocculating agent and the roof mastic formulation may be mixed internally and sprayed from one gun. Warburton also discloses that as an alternative to simultaneous cospraying, the polyamide-epichlorohydrin resin solution (accelerator solution) could be sprayed as a second coating on top of the first roof mastic coating.

Warburton in the examples states that the sprayer employed was a Binks Model 69GW plural component spray gun with 68 fluid nozzle, orifice 0.110 inch; 68PB air nozzle; 568 fluid needle; providing 80 psi to atomizing nozzles; and generally 9-10 psi cup pressure. The cup pressure was varied depending on viscosity of the roof mastic formulation in order to achieve the desired flow rate. Flow rates were determined by spraying into a weighed wide-mouth polyethylene bottle for a measured time interval, reweighing the cup, and calculating the flow rate in grams per minute. Coatings were prepared on steel panels, approximately 15 mils (0.38 mm) thick wet.

Cogliano in U.S. Pat. No. 3,823,024 teaches that in the examples set out in Table I, of the patent that an air pressurized spray gun assembly having dual pressure feed tanks and spray guns with intersecting axis was used.

Takegawa U.S. Pat. No. 4,386,992 discloses that according to the present invention, both of the gelling agent (accelerator) and the aqueous emulsion adhesive are simultaneously applied to the substances to be bonded. That is, both of the gelling agent and the aqueous emulsion adhesive are each sprayed and thereby mixed in the state of mist, and then applied to the substances to be bonded. That is, the gelling agent and the aqueous emulsion adhesive are each simultaneously sprayed onto either one or both of the substances to be bonded so that the spraying areas of both the gelling agent and aqueous emulsion adhesive are overlapped, and thereafter, the substances to be bonded are piled up and a pressure is given thereon. The spraying machine is not limited and includes any machine which can spray both the gelling agent and aqueous emulsion adhesive so that the spraying areas are overlapped, for example using two spray guns which are regulated so that the both spraying areas are overlapped, or a spray gun having two spray nozzles (e. g. 69 GW PLURAL COMPONENT SPRAY GUN, made by Binks Manufacturing Company, in U.S.A.). Alternatively, both the gelling agent and aqueous emulsion adhesive may simultaneously be sprayed from air nozzle and fluid nozzle respectively by using one spray gun. Takegawa also discloses that the gelling agent is used in the form of a 0.5 to 50% by weight aqueous solution.

Dubble in U.S. Pat. No. 5,403,393 discloses that preferably the flocculating agent (PART B) and the roof mastic (PART A) are simultaneously applied to the substrate. In one embodiment, PART A and PART B are each sprayed as converging or overlapping streams and mix in the state of mist as they are applied to the substrate. The particular spraying machine used to apply the coating in the embodiment is not critical and includes any machine that can spray both PART A and PART B so that the spraying areas overlap. For example a spray gun having two spray nozzles (e. g., Binks 25 Model 69GW plural component spray gun, Binks Manufacturing Co., Franklin Park, Illinois) can be used.

Dubble further discloses that at the ratio of 100 (PART A)/5 (PART B) the mixture of the example will literally gel in the air as it is being cosprayed and will be able to withstand a water hose after 60 seconds even when sprayed continuously on a vertical or overhead surface until it is one inch thick.

Jordan in U.S. Pat. No. 4,571,415 teaches that a variety of application techniques may be employed with the compositions of the present invention. To some extent, the application technique depends on the viscosity and rheology of the composition. The roof mastics of the present invention have a viscosity which is somewhat greater than exterior latex paints and they are conventionally applied by spray techniques such as by airless spray. Other techniques, such as application by brush, roller, electrostatic spray, etc., may also be used as appropriate. Caulks may be applied by gunning.

Each system described above in the various patent disclosures have unique features and characteristics depending on the chemistry of the first component of the two part system that comprises an aqueous dispersion of water-insoluble latex polymer and the chemistry of the second coating component that usually comprises accelerators that flocculate and or coagulant and or precipitates the solids or semi-solids from the aqueous solution. The examples used in the above mentioned patents primarily take place in a controlled environment like a laboratory or building with controlled temperature, humidity and the like.

The spray equipment mentioned in the above patents is primarily located in close proximity to the samples being prepared or at the surface or surfaces being coated with the rapid curing two component mixtures. Harco in US Patent No. 2015/0140224 A1 discloses that low viscosity components are particularly advantageous to their invention since the low viscosity liquid resin solution and low viscosity liquid accelerator solution enable the delivery system to have a longer delivery tube or hose length, typically on the order of up to 250 feet depending on pressure settings and so on, so that equipment and materials can be located on a lower level or at a remote location from the surfaces to be coated thereby avoiding the difficulty and labor of transporting and moving materials and or the spray equipment along with the person doing the application in and around the job or coating site. It is unclear if the Harco invention was actually applied up to 250 feet in elevation from the delivery system to the surfaces to be coated. Experiments using the exact spray system mentioned in the Harco patent do not support that the invention can actually be used up to 250 feet above ground level even when water is used for both components. This means the equipment must be moved in and around the roof area and or job location with the hose horizontal from the spray equipment for the equipment to function as described in the patent.

None the less it does not matter if Harco actually conducted experiments up to 250 feet to the surfaces to be coated as it has become common practice in the industry for spray delivery systems like the Binks 25 Model 69GW plural component spray gun, Binks Manufacturing Co., Franklin Park, Illinois for example that can have a spray gun with two nozzles as further described by Harco in US Patent No. 2015/0140224 AI that uses air pressure to move the components through the hose and into the spray gun for delivery onto the roof or surfaces to be coated. It has also become abundantly clear that if a spray delivery system is located remotely or up to 250 feet from the surfaces being coated that adjusting the spray pressure of each component requires someone standing at or near the spray delivery system, I. e. pump equipment, dials and indicators with a means of communicating with the person up to 250 feet away, usually on an elevated location on or in a building, roof or carport or the like adjusting the pressure controllers and flow rates as the temperature of the material warms up causing a faster flow rate or cools down causing slower flow rates as it is well known in the industry that the viscosity of the materials will affect flow rate so that the pressure or apertures will need to be increased or decreased accordingly as described in the above mentioned Harco patent.

Harco goes to great length describing the spray equipment for example the Harco patent teaches that "in FIG. 1, the coating delivery system 20 includes a cart 22 with an air-operated resin pump 24 and an air-operated accelerator pump 26, a compressed air supply as represented by arrow 28, and an airless spray gun 30 fluidly connected to the pumps 24, 26 and air supply 28. Although the resin and accelerator pumps are preferably air-operated, it will be understood that the pumps may alternatively be electrically powered. The compressed air supply may be in the form of an air compressor, pressurized air tank, or a combination thereof. Preferably, to meet optimal coating requirements, a suitable compressed air supply delivers approximately 20 cubic feet per minute at 100 psi.

The cart 22 preferably has a first U-shaped frame 32 that extends generally upwardly and rearwardly from a forward end 36 of a horizontal platform 34 to form a handle 38, a second U-shaped frame 40 that extends generally vertically between a rear end 42 of the platform 34 and the first U-shaped frame 32, a support panel 44 that is mounted to the second frame 40, and a pair of wheels 46, 48 rotatably connected to the platform 34 for transporting the cart 22. A tool tray 59 is mounted to the cart 22 above the support panel 44.

The resin pump 24 is preferably securely supported on the platform 34 and includes a first fluid input port 50 for receiving the resin solution 12 from the container 14, a second fluid input port 52 for receiving air under pressure from the compressed air source 28, and a fluid output port 54 for delivering the resin solution 12 under pressure to the spray gun 30. A relatively stiff suction conduit 56 is adapted for insertion into the resin solution 12 located in the container 14. A filter element 58 is collected to a lower end of the suction conduit 56 to filter out foreign matter that may be present in the resin solution during resin pump operation. A flexible suction tube 60 extends between the suction conduit 56 and the first fluid input port 50 for drawing the resin solution 12 under vacuum from the container 14 to the resin pump 24. A flexible resin delivery tube 62 extends between the fluid output port 54 and the spray gun 30 for delivering the pressurized resin solution to the spray gun 30. Preferably, the resin pump is a stainless steel diaphragm pump that operates when compressed air is applied to the second fluid port 52 to suction resin solution from the container 14 and deliver the resin solution under pressure to the spray gun 30. However, it will be understood that other types of pumps can be used. Prefer ably, the ratio of applied compressed air pressure to the sup plied resin solution pressure is 1:3, such that an applied air pressure of approximately 100 psi to the second fluid port 52 results in a supplied resin solution pressure of about 300 psi to the spray gun 30. The accelerator pump 26 is preferably securely supported on the support panel 44 above the resin pump 24. A relatively stiff suction conduit 70 is adapted for insertion into the accelerator solution 16 located in the container 18. A filter element 72 is connected to a lower end of the suction conduit 70 to filter out foreign matter that may be present in the accelerator solution during accelerator pump operation. A flexible suction tube 74 extends between the suction conduit 70 and a first fluid input port 76 for drawing the accelerator solution 16 under vacuum from the container 18 to the accelerator pump 26. A flexible accelerator delivery tube 78 extends between a fluid output port 80 of the accelerator pump 26 and the spray gun 30 for delivering the pressurized accelerator solution to the spray gun 30. Preferably, the accelerator pump operates when compressed air is applied to an air inlet port 82 to suction accelerator solution from the container 18 and deliver the accelerator solution under pressure to the spray gun 30. Preferably, the accelerator solution is pressurized at about 60 psi to the spray gun 30. An air delivery tube 79 is fluidly connected between the spray gun 30 and the compressed air supply 28 to provide pressurized air to the spray gun 30 for both controlling operation of the spray gun and controlling the amount of atomization of the accelerator solution 16, as will be described in greater detail below. The delivery tubes 62, 78 and 79 may be contained within a flexible sleeve 81 for protection during storage, transportation, and use. The support panel 44 also includes gauges 84, 86, and 88 and adjustable pressure regulators 90, 92 and 94 for selectively monitoring and adjusting the delivery air pressure to the resin pump 24, accelerator pump 26, and the spray gun 30, respectively. Accordingly, the precise delivery pressure of the resin solution 12, the accelerator solution 16, and the atomizing and operating air to the spray gun 30 can be controlled with a high degree of accuracy. An oil and water filter 96 is mounted to the support panel 44 and includes an input port 98 for receiving air under pressure from the compressed air source 28. An output (not shown) of the filter 96 is in turn fluidly connected to the resin pump 24, accelerator pump 26 and spray gun 30 through the pressure regulators 90, 92 and 94, respectively."

It should become clear after reading the Harco patent and the other patent references mentioned previously that there are a significant amount of parameters, elements and factors that need to be considered and monitored if a viable and long lasting roof coating or the like is applied with just the pump system that uses air pressure to deliver the two solutions or mixtures of the rapid set coating so that the two components mix completely and in the proper ratios needed for the cure of the rapid set coating to occur in order to form an acceptable exterior roof coating application that meets acceptable performance standards like ASTM D6083 Type II that covers testing and material properties of water-dispersed protective roof coatings composed of a water-based acrylic latex elastomeric emulsion polymer, to which various pigments and other additives have been added to give the required physical properties and ASTM D903 that covers the test method detailing the standard procedures for the determination of the comparative peel or stripping strength characteristics of adhesive bonds when tested on standard-sized specimens and under defined conditions of pretreatment, temperature, and testing machine speed.

The curing mechanism requires that an accelerator component or the like, coagulates and or flocculates and or precipitates the aqueous dispersion of water-insoluble latex polymer usually prepared by emulsion polymerization out of solution to form a rapid cure or rapid setting coating. There are several factors that can affect the mixing and ultimate cure rate of the rapid set two component aqueous latex systems. These factors include but are not limited to the pressure of the two pumps, the extent of atomization and therefore extent of intermingling of the two components to facilitate curing, the distance of the delivery system (pumps) to the roof, the length of hose being used, the diameter of the hose and the partial pressure caused by gravity if the delivery system is located on the ground or at a level two or even 3 stories from the surfaces to be coated.

It has been found that if the air pressure of the accelerator component is higher or more accelerator is used than what is needed for proper cure in the system, that the cure of the rapid set coating will occur too quickly and cause the cured coating to fail ASTM D6083 Type II physical properties and if the air pressure of the accelerator component is lower than needed or less accelerator is used than what is needed in the system then the cure of the two component system will be slowed considerably. This argument can be made for the latex polymer component as too much or too little pressure causing high or low quantities of the aqueous latex component will cause too rapid or too slow a cure rate also.

Other factors that need to be considered to facilitate the cure of the external aqueous latex two component rapid set or cure coating is the orientation of the nozzles on the spray gun particularly the spray guns mentioned in the patents above. Harco in US Patent No. 2015/0140224 A1 further discloses that the nozzles should be oriented at particular angles to ensure complete overlap and mixing of the two components. Harco teaches that different resin nozzle sizes with different angle of spray require different resin air pressure/liquid pressure, different atomization pressure, different accelerator nozzle size, and different accelerator pressure.

Harco further teaches that these two charts are just examples for reference only and that other nozzles with different application angles, apertures, etc. can be used with their invention that by intuition would require different resin and different accelerator atomization pressures.

The many issues and factors mentioned above that relate to component viscosity, air pressures, fan angle and geometry, aperture opening, component atomization, quantities of the two components, etc. that can impact the intermingling of the two components that affect cure rate and amount of cure and thereby the quality of the rapid setting coating or caulk for example do not even include environmental factors like wind, humidity, air temperature, the temperate of the surfaces being coated, the temperature of the two components being intermingled, the distance of the spray gun to the surface being coated and so forth to mention a few.

The inventions mentioned previously have not taken into account these multitudes of issues that can arise during the application of a coating let alone the application of a rapid set, quick cure two component system.

Another well-known issue arises when applying rapid set or quick cure systems using air driven equipment like the Binks 25 Model 69GW plural component spray gun, Binks Manufacturing Co., Franklin Park, Illinois for example or the like or any air driven equipment where air pressurizes the system and uses a spray gun with nozzles to apply the two components of the rapid set or quick cure system that manufacturers of this type of equipment and applicators alike are trying to solve. The issue that occurs when using an air pressurized system to deliver the two components to and through the spray gun is that the cured upper surface of the two component rapid set or quick cure coating is uneven, rough and often has a textured appearance that can trap dirt, water or the like reducing the coatings ability to reflect solar heat causing a decrease in the coatings reflectivity and emissivity. Also the appearance of the cured coating with the rough and or pitted surface is not aesthetically pleasing to the eye and often contains unwanted air voids or the like that could cause the cured coating to fail ASTM D6083 Type II requirements. Applicators and equipment manufacturers that use air pressure to feed the two components of the rapid set or quick cure system to and through the spray gun have tried many ideas and have made multiple changes and adjustments to the equipment and or spray gun to no avail.

Exterior coatings are exposed to the changeability of weather from the moment they are applied to the moment they cure to protect an exterior surface. Water based coatings are favored over solvent borne coatings for a number of recognized reasons. The water based coatings offer ease of application, reduced toxic solvent emission, lower raw material, and application costs, and easier cleanup of materials and equipment. However, water based coatings are particularly vulnerable to water damage during and immediately after application. Some exterior surfaces require rather thick coating applications typically on the order of 20-40 mil range or so. These coatings are often applied by spraying techniques. These thicker exterior coating applications lose water by evaporation relatively slowly in comparison with say house paints that are typically applied at a much lower thickness typically in the 5-8 mil range. In order to avoid aqueous exterior thick surface coating application washout or damage due to water, it is often necessary to apply the desired and necessary coating thickness in two or more separate applications, which will increase labor costs.

The overall desire of the rapid set or quick curing two component aqueous elastomeric coating system disclosed in the patents mentioned above is to produce a quality, long lasting exterior elastomeric coating or caulk that can cure faster than conventional elastomeric coatings to prevent wash out from unexpected precipitation particularly rain showers, have similar or improved physical properties as the conventional exterior aqueous elastomeric coatings, and allow a thicker wet and ultimately dry coating thickness to reduce the cost and time needed for conventional coatings to cure and reapply as needed to meet manufactures guidelines and warranties.

Typically the person or applicator applying the two part rapid set coating that usually comprises an aqueous dispersion of water-insoluble latex polymer prepared by emulsion polymerization and an accelerator for example will normally set up the spray rig on the ground and will adjust the spray equipment and nozzles to the settings used for previous applications or set the equipment and nozzles to the recommendations set forth by the manufacturer of the equipment or set forth by the manufacturer of the two part rapid set components as a starting point only as each job is different. The temperature of the two component parts most likely will differ, the ambient temperature most likely will differ at the start of the job and also during the job and this is an important parameter to remember, the humidity will most likely differ from job to job and even during application. These parameters and more can affect the cure rate and quality of the material being applied.

To start a rapid cure or quick set job, the applicator adjusts the nozzles and sets the pressures and hence the flow rates of the two components being applied to a previous or recommended setting on ground level or on the same level as where the spray equipment is located in order to make additional and needed adjustments readily and easy. The applicator then begins the process to ascertain if there is an acceptable overlap of components, an acceptable intermingling of the two components, an acceptable cure time or tack free time of the two components, if the two component system is delivering the proper dry coating thickness and if the surface of the rapid or quick cure coating is smooth by usually turning on the pump motors and squeezing the trigger of the Binks 25 Model 69GW plural component spray gun or similar spray gun or similar spray equipment and spraying the two components onto a piece of scrap material, like a box, cardboard, newspaper or the like, in both the horizontal and vertical positions. The applicator will look for good coagulation and coating characteristics.

The applicator after stopping the spraying process will wait to check the cure rate by monitoring the surface film to make sure the two components particularly the accelerator level is set correctly. Also the applicator may check the application rate and measure the rate of cure. Once the 2 component rapid cure or quick set coating is cured, the applicator often measures the thickness of the applied cured material to determine if the equipment settings produced the proper thickness of material without air voids or shrinkage of the cured or semi-cured components.

The applicator will then make adjustments as needed to fix and or adjust the flow rates, nozzles, etc. and repeat the process described above until the proper settings are found. This may take several tries depending on the system being used as there are many systems patented.

For example Warburton U.S. Pat. No. 5,219,914 in claim 1 states that part one of the patented system can have "from about 50 to 90% solids and that Part two of this system should be mixed with part one from about 0.3% to about 5% based on the total roof mastic solids, in an amount effective to flocculate the anionic polymer emulsion when the contents of the two packs are mixed."

Takegawa U.S. Pat. No. 4,386,992 states in claim 3 of the patented system the following, "A method according to claim 1, wherein the gelling agent is used in the form of a 0.5 to 50% by weight aqueous solution" and then in claim 4 it is stated "A method according to claim 1, wherein the aqueous synthetic resin emulsion adhesive and the gelling agent are used in the ratio of 100:0.005 to 100:5 by weight (as the solid component)."

Harco in US Patent No. 2015/0140224 A1 discloses in claim 1 the following:

"A method of applying a coating to a surface, comprising:
a) Providing a spray gun with first and second nozzles;
b) Discharging a resin solution from the first nozzle at a first fluid pressure;
c) Aerating an accelerator solution with compressed air;
d) Discharging the accelerator solution from the second nozzle at a second fluid pressure;
e) Combining the discharged resin solution with the discharged accelerator solution before application to the surface; and
f) Substantially curing the combined resin and accelerator solutions before application to the surface."

It is interesting to note that in all of these systems described above, typically the accelerator component is typically without color, and it is usually clear and transparent and normally has the appearance of water or the like. Also of note is that the ratio of accelerator to liquid resin component varies considerable between and inside each of the patents listed above.

It should be noted that just like ordinary latex paint, coatings or the like purchased directly from a manufacturer or from a store, the rapid set and quick cure components especially the resin component needs mixing prior to use as the pigments and fillers will settle out of solution. The fillers, pigments and other additives need to be thoroughly mixed and dispersed in solution prior to use for best results. This is common knowledge in the coatings industry, do it yourself persons and professionals alike. Some rapid set or quick cure formulas, particularly the resin component that contains the fillers, additives and pigments need to be mixed prior to spraying and often frequently and sometimes continuously during the spray application of the two components. Some manufactures of rapid set or quick cure components and or some two component rapid set or quick cure equipment manufactures often include a boat paddle or the like to mix the resin component delivered typically in 55 gallon drums that are often used with spray equipment. When a boat paddle, stirrer, or the like is used to mix the resin component you typically need a person mixing the 55 gallon drum continually to keep it from separating.

Based on the patents cited above, not only does the applicator need to adjust the air pressure, calculate the flow rates of both components of the rapid set mixture based on the solid content of the first component and the solid content of second component, the applicator needs to make sure that the two streams overlap and are intermingled in sufficient quantity to cause coagulation and flocculation for rapid discharge of the cured components. The applicator needs to be cognizant of temperature changes that can cause an increase or decrease in viscosity of either or both of the two components used in the system and increase or decrease the flow rates of one or both of the components used in the rapid set coating system. Also the applicator must be sure that the components of the rapid set or quick cure system are thoroughly mixed and often needs another helper to not only make adjustments at the equipment but to also keep the resin component mixed to prevent separation of fillers, additives, pigments and the like.

The amount of cure is critical for adhesion to different surfaces. If the components have poor intermingling and or that the accelerator level is too low, then the components will take a long time to set up or cure thus defeating the purpose of the rapid set coating system. If the components have partial overlap even if the accelerator level is correct and the two components intermingle as desired, the areas where there is low or insufficient accelerator levels will not set up or cure quickly or at all.

If too much accelerator is used the two components will coagulate and flocculate rapidly and cure very quickly. This cure can even happen in midair where the two components are overlapped and are intermingled even before the spray reaches the surface of the structure being coated. When the cure happens in midair as described above, adhesion to the structure can be compromised. Poor adhesion of the rapid set coating system can reduce the length and performance of the rapid set coating and can cause water to be absorbed into the rapid set coating or the rapid set coating could peel off the structure prematurely.

Once the applicator has made the necessary adjustments to the flow rates, pressures, nozzles, etc., the applicator may then take the spray gun attached to the spray equipment via a hose and coupling up to the roof, building, structure, etc. where the applicator will check the spray equipment yet again for spray quality by spraying the two components onto a larger test area.

After spraying the larger test area the applicator determines if it is necessary for further adjustments. If adjustments are needed to the flow or pump pressures for example the applicator will call down to an assistant located at or near the pump rig and have the assistant make the recommended adjustments. Depending on the adjustments needed and the spray equipment being used, the applicator could make small adjustments to the flow of the components and hence the ratio of the two components by turning or adjusting dials or the like on the spray gun.

It should now become apparent that there is a problem with the overall process for proper adjustment of the two components for the various systems mentioned previously that are rapid cure or quick set coatings, adhesives, mastics, caulks, etc., since the adjustment process is time consuming, tedious and laborious. What is needed is a solution that reduces the time, effort and costs associated with the loss of time it takes to make these adjustments, to dial in the amount and or ratio of the two components of rapid cure or quick set coatings, adhesives, mastics, caulks, etc.

The solution should also allow the applicator to have a visual aid so that the applicator can visibly see when the two components are overlapped and or intermingled. The solution should also allow the applicator a way to visibly see that the accelerant component is being pumped and or supplied to the spray gun since the accelerator is typically without color, clear and or transparent. The solution should also allow the applicator to visibly see that the proper amount of accelerator is being added to the system to ensure that the physical properties of the rapid cure or quick set coatings, adhesives, mastics, caulks, etc. meet industry standards like ASTM D6083 Type I or Type II.

Conventional roofing applications that use standard latex and or silicon and or urethane and or hybrid technology coatings to coat roof surfaces or structures often require several layers of coating to protect the roof or structure as is well known in the art. Sometimes the applicator needs to apply three, four, and even five coats of material. The applicator begins to apply the next layer of coating once the first coating layer is dry and is often visually challenged as to where the second coating layer of material has been applied on top of the first dry coating layer particularly if the first coating layer is of the same color, hue or tint as the next coating layer of material being applied on top of it.

Manufactures of coatings, adhesives, mastics or the like that require more than one application of material have solved this visually challenging issue by incorporating a permanent durable tint in the base coat material or primer material often in the factory so that the base coating material and or primer material remains tinted or with color after drying that is different in color than the next layer of material being applied on top of it thus making it easy for the applicator to know where the second and or top layer of material has been applied onto the dried colored base layer of coating material. The permanent durable tint used to color the first and or base and or primer material can be purchased already added in the base coating material or primer material or the color tint can be purchased separately and added in the field to the first and or lower and or primer coating material.

No matter what color is used to permanently tint the lower and or first and or base and or primer coating material it is vital that after drying the color remains durable and visible to be successful. Now when the applicator applies the next layer of coating material, the applicator can visually see where this next layer of coating material has been applied on top of the first coating layer material so that no areas are missed. The second and or ensuing coating layer is designed to hide the permanent durable color of the tinted coating applied in the first coating layer material.

The resin part or part one of the two component system typically has pigments, additives and fillers to form a protective exterior coating and also to add color to the external coating, mastic or the like and this pigment can be any color but is typically white to reflect solar heat and reduce energy consumption as is well known in the art. The second part of the two component system that contains the accelerator usually does not contain pigments and is colorless and typically transparent. One can imagine that visually gauging the overlap and intermingling of a pigmented component and a colorless transparent component would be very difficult to gauge at best.

Rapid cure or a quick set two component system often builds the needed coating thickness in one application when applied to a roof and or structure or the like. This is the benefit of such a system to save time, labor, and costs.

SUMMARY

Disclosed is a device and process for applying a quick dry rapid set aqueous solution. The process includes adding an indicator of a selected color and composition added to an accelerator to be applied along with a resin. The indicator is typically blue and allows the user to determine if the proper mixture is being applied. The indicator is visible only during application and disappears after application. The resin and accelerator are applied using an airless cospray pump and spray gun. The device is a spray gun with 2 nozzles and the capability to set the angle between the nozzles.

BRIEF DESCRIPTION OF THE DRAWINGS

THE PATENT OR APPLICATION FILE CONTAINS AT LEAST ONE DRAWING EXECUTED IN COLOR. COPIES OF THIS PATENT OR PATENT APPLICATION PUBLICATION WITH COLOR DRAWING(S) WILL BE PROVIDED BY THE OFFICE UPON REQUEST AND PAYMENT OF THE NECESSARY FEE.

PARTS LIST

Figure 1:
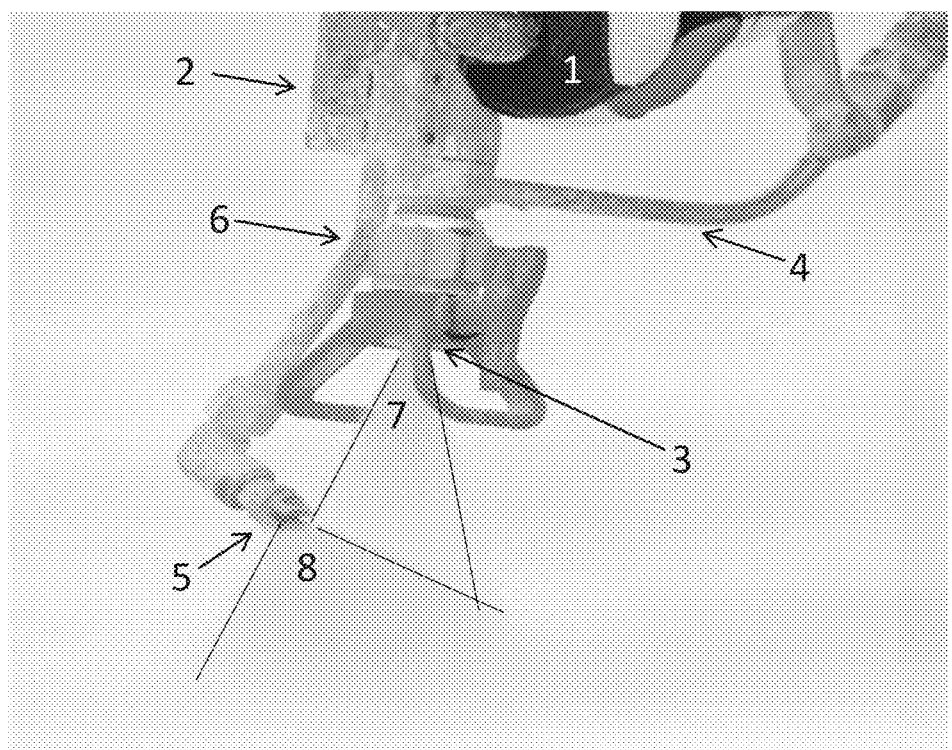
FIG. 1 is a view of the disclosed spray gun.

1 Applicator/User
2 Cospray spray gun
3 Resin component spray nozzle
4 Resin component pipe
5 Accelerator spray nozzle
6 Adjustable accelerator pipe
7 Liquid resin component
8 Accelerator component with blue indicator
9 Angle adjustment tool
10 Rapid set coating
11 Faint blue lines
12 Dark blue splotches
13 Rapid set coating overlap area
14 Accelerator container
15 See through accelerator hose
16 Resin component hose
17 Primer coat
18 Roof surface
19 Siphon tube
20 ~140 degree angle

DIAGRAMS

Diagram 1 shows a typical plot of water swelling
Diagram 2 shows swelling test results

TABLES

Table 1 shows a typical plot of water swelling.
Table 2 shows experiments using the disclosed low pressure spray equipment at a fixed pressure for each of the components.

DETAILED DESCRIPTION

Disclosed are unique solutions to:
Reduce the time it takes to adjust the nozzles, the flow pressures and ratios and assure that there is proper overlap and intermingling of the two components of the rapid set material to be applied onto the surface of a structure and or roof or the like using the standard air pressurized equipment or the new unique equipment that does not require air to pressurize the two components.

Have a rapid set and or quick set two component system with a smoother surface profile, cures with reduced voids and air pockets, and forms a good film on the coating rapidly with properties that met ASTM D6083 Type II standards using equipment that does not use air to pressurize the two components through the hose and spray gun in combination with a unique spray gun design.

Use the unique spray equipment to apply the polymeric resin component at a reduced pressures of 500-900 psi to supply the resin to the cospray gun and 40-100 psi to supply the accelerator to the cospray gun to efficiently intermingle and mix the two components for fast drying and rapid setting of the coating.

Use the unique spray equipment machine that does not use air to pressurize the two components located on the ground level or lower level that can spray the two component rapid set or quick cure system a minimum of 300 feet or more horizontally or vertically using a unique spray gun and maintain the smooth surface profile surpasses equipment used in the art today.

Have the ability to use two hoses and two spray guns at the same time using only one spray equipment machine that does not use air to pressurize the two components using two unique spray guns and maintain the smooth surface profile through both unique spray guns thus reducing time and labor to complete a job.

Has the ability to quickly change the amount of material applied by increasing or decreasing the nozzle tip size on the spray gun equipment without making other adjustments to the equipment.

Has the ability to adjust the accelerator amount injected into and intermingled with the resin component stream by adjusted by nozzle tip size on the spray gun equipment to accelerate the set time or decelerate the set time of the rapid set or quick cure system.

The disclosed process/system and device solves the overlap issue and helps the applicator visualize when the two components are overlapping completely. It has been discovered that the addition of a indicator, particularly an indicator that is tinted with a color like red or blue that when dry becomes clear and or colorless such as SUN-SET available from the Dow Chemical Company for example that when added to at least one of the two components of a rapid set two component coating, adhesive, mastic or the like, being applied, sprayed and or intermingled prior to and or during application solves the major issue of assuring that there is proper overlap of the two components.

The tint used in the conventional roofing application example mentioned previously where an indicator with a tint remains colored after drying or curing for use in the base coat or primer so that an applicator when applying the second or top coat of material can visualize where the second or top coat has been applied. The tint or indicator used in one or both components of the disclosed rapid set system/process remains tinted or colored when wet or uncured but becomes clear and or colorless and or matches the desired color of the first component containing the pigment once it is dry and or cured.

Well know indicators that could be used for this purpose include Phenol Red or Bromothymol blue or the like and are listed as examples of indicators that have been found to be effective when added to aqueous exterior coatings. These indicators have a tint and or color when added to the aqueous exterior coatings at a high pH usually when the aqueous exterior coating is uncured but fade to a light clear color and or colorless or the like so that the indicator is no longer visible to the naked eye over time when the aqueous exterior coating has a lower pH when it is dried or is cured. It should be understood that these are only a few indicators listed as examples and that any indicator that can change from having a tint or color in an uncured aqueous exterior coating and will become clear and or colorless or the like when the aqueous exterior coating is dry or is cured despite the chemistry of the indicator is captured in this disclosure for the use indented in this invention.

One of the main reasons why it is vital that the rapid set two part aqueous exterior coating system have sufficient overlap and or proper ratios and or proper intermingling of the two components is because an issue with water pick up and or water swell that reduces the quality of the aqueous exterior coating can occur when the ratio of accelerator to the resin component is too low or too high during application. ASTM D6083, a specification for aqueous exterior roof coatings, requires a water swell lower than 20%. The greater the water swell, the better the chance of the coating pulling away from the substrate and causing problems. Table 1 demonstrates not only what happens to the percent water swell when the accelerator level is too low, correct and or too high but also describes the deposited film characteristics of the aqueous exterior coating of a rapid set two component system but also the differences in Tensile and Elongation properties but also the characteristics of the cross section of the film after curing.

Water swelling in the ASTM D6083 standard is a test for water resistance. This is measured by ASTM test method D471. The purpose of this test is to determine how much water is absorbed in the dried or cured coating film. A sponge is a good example of a material that can absorb water. This is an important value when judging a coating's performance in the laboratory since it is possible for coatings to absorb water, thus reducing their inherent performance properties.

The test simply described consists of a cured or dry coating film having a known weight being placed in a container of water and removed periodically and reweighed while still wet. The percent weight or water gain is recorded and is plotted verses time. A typical plot of water swelling is shown in Diagram 1.

The maximum value for this test is 20% and this value was derived by ASTM from evaluating actual roof coatings that were performing satisfactorily in ponded water areas and establishing this maximum value based on these tests.

The swelling test results as shown in Diagram 2 is important since, as the coating swells, it creates stresses at the interface of the coating and roof substrate or structure. High percent swelling indicates that there could be larger interfacial stresses between the roof substrate or structure and the coating at the interface. This higher stress could cause the coating to delaminate from the roof substrate or structure causing premature failure of the external aqueous coating.

The indicator used in this disclosure is blue in color that fades to white or becomes clear or colorless when subjected to outdoor exposure from the sun. The indicator is typically added to the accelerator component of the two component rapid set system so that the percent by weight of indicator in the accelerator component is in the range of 0.01% to 10.00% by weight. For existing two component systems the indicator is typically added to the accelerator component of the two component rapid set system because the accelerator component is generally lower in viscosity then the resin component and the indicator mixes readily and easily with the lower viscosity accelerator component.

The resin component of a typical existing two component rapid set system often contains pigments and fillers that add color, hue, tint, or the like to this component while the accelerator component is usually clear or colorless often without pigments or fillers added to it. The pigments and fillers that are added to the resin component would reduce and or mask and or conceal the visibility of the indicator during application. It has been found that often 100% more indicator is needed in the resin component then in the accelerator component to overcome the pigments and fillers in the resin component for the indicator to work properly as intended. Adding this amount of indicator would not be a viable and cost effective solution compared to the small percentage of indicator that is needed for the accelerator component.

With the disclosed process/system when using the recommended amount of blue indicator in the accelerator component it is easy to determine the proper amount or ratio of the two components being applied. The addition of indicator reduces the time and effort needed to "dial in" the proper ratio of the two components. When the proper ratio of accelerator to resin component is found, the resulting spray pattern will have two faint but distinct blue lines flanking the spray pattern in the rapid set coating overlap area on the roof substrate or structure. The user/applicator now knows when the accelerator to resin component ratio is optimized to produce the best coagulated film from the disclosed two component rapid set spray gun shown on FIG. 1.

Figure 3:
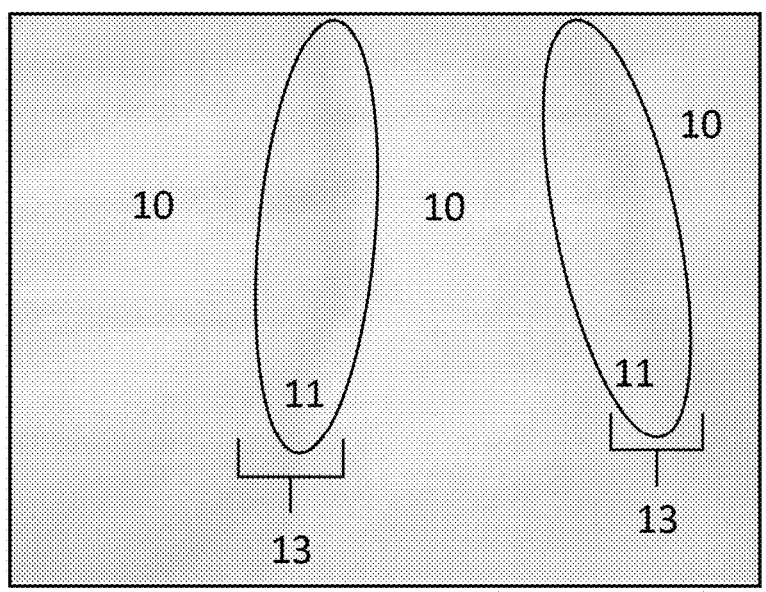
FIG. 3 shows the faint blue indicator lines on top of the rapid set coating.
Figure 4:
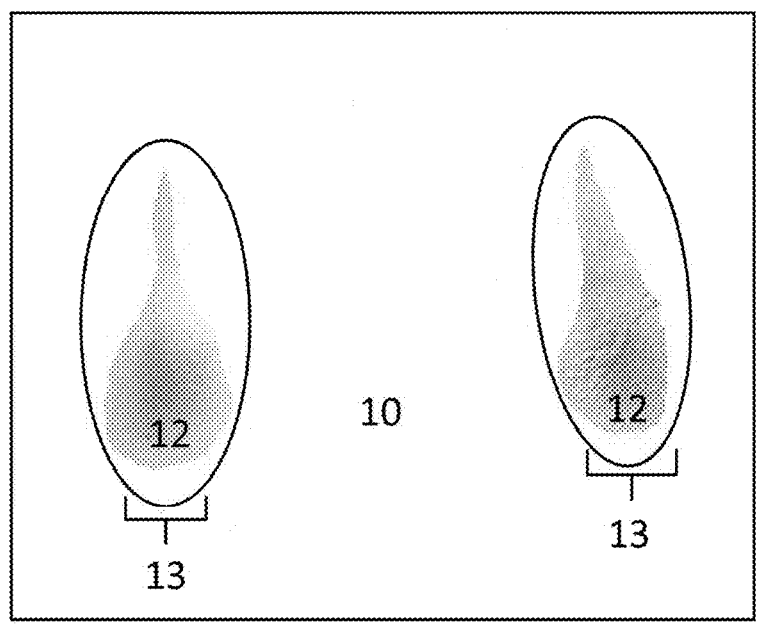
FIG. 4 shows dark blue splotches on top of rapid set coating.
Figure 5:
FIG. 5 shows an accelerator container with accelerator siphon.
Figure 6:
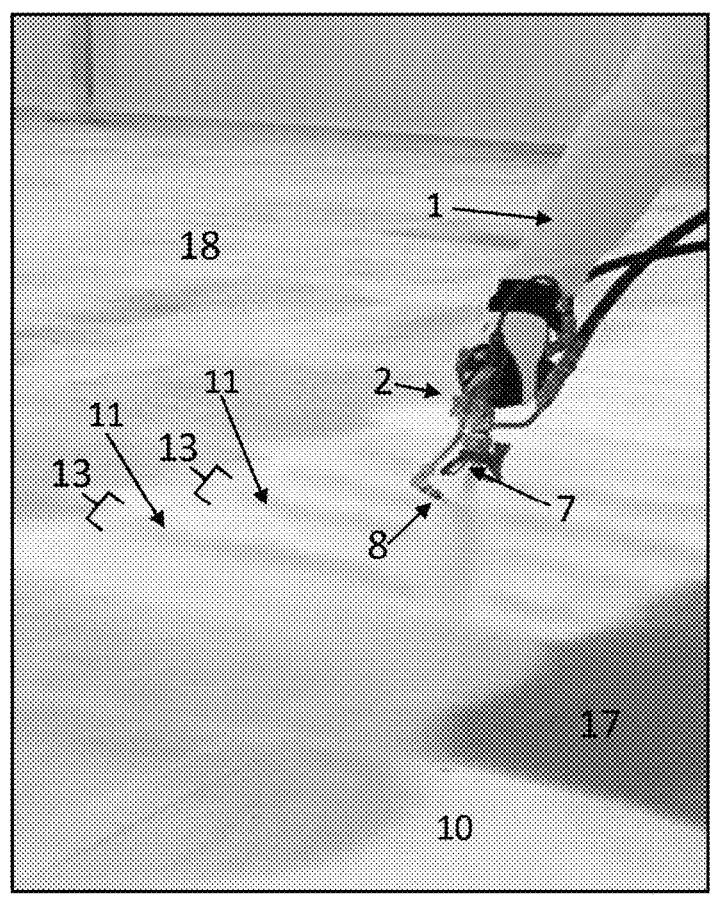
FIG. 6 shows a user applying the resin and accelerator.

These faint blue lines shown on FIGS. 3, 4, and 6 provide the applicator a visual guide not only of the proper ratio of components but a visual guide as to where the material has been applied. These faint blue lines will disappear in time leaving the coagulated film and or coating of a uniform color.

Figure 2:
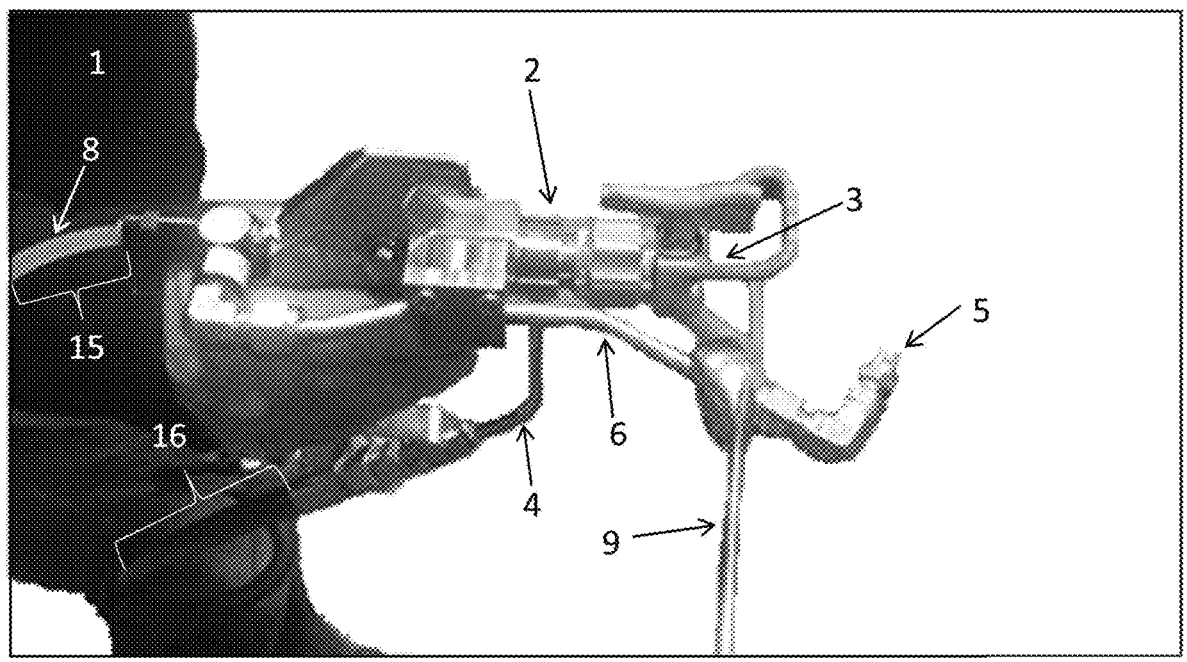
FIG. 2 is another view of the disclosed spray gun.

The user/applicator can also determine if and when too much accelerator component is being used in conjunction with the resin component when the indicator is used as recommended in the accelerator component. The formation of dark blue lines and sometimes spots and or splotches will form at the edges of the rapid set coating overlap area when too much accelerator is used in the system during application of the two components by a spray gun as shown in FIG. 2. Also, too much accelerator in the system often causes shrinkage and poor coating performance of the rapid set coating after application.

When too little accelerator is used, there are no blue lines at the edges of the rapid set coating overlap area during application by the spray gun. The applied material with too little accelerator will not set rapidly and properly. The coagulated film will not have the desired thickness or functionality when using an under catalyzed two component rapid set system.

There are additional benefits of using the indicator in the accelerator component. If the accelerator runs out and is no longer being applied and or the pump fails so that the accelerator component is stopped or is reduced for one reason or another like a clog in the spray tip or line, the applicator using the spray gun equipment can tell immediately that there is an issue due to the visual disappearance of the light blue lines at the edges of the spray pattern of the rapid set overlap area.

The applicator now has a quick and reliable visual confirmation that the accelerator is or is not being used in the system and that the accelerator to resin component ratio is at a proper ratio in the rapid set coating system/process. If the blue indicator lines stop appearing at the edges of the rapid set coating overlap area, the applicator can immediately correct the issue without spraying a significant amount of roof substrate or structure saving money and time and preventing poor performance of the rapid set coating system.

Another benefit of using a colored indicator in the accelerator component is that typically the accelerator component is colorless and often the tubing running from the accelerator component to the spray gun equipment is also clear and or colorless and or translucent. When the accelerator component and the tubing are both clear and without color there is no visual guide to gauge if the accelerator is being pumped and supplied to the spray gun equipment.

The indicator in the accelerator component allows visual confirmation to the applicator that the accelerator is being consumed as part of the two component rapid set system. Also the blue indicator turns white and or clear in UV light relatively quickly after application. The blue colored indicator has been added to the accelerator component as shown on FIGS. 3, 4, and 6.

Additionally, cross contamination and intermingling of the accelerator component with the resin component of a two component rapid set coating system prior to pumping and or prior to application will create significant issues with the spray equipment. When the two components are inadvertently mixed or comingled even in a very small amount, the combined components will form a particulate that can jam the spray gun and or the pump and or the lines, etc., causing extensive down time to correct. The blue color of the indicator added to the accelerator is a visual safety factor for applicators.

Once the proper accelerator and or accelerator level is found, additional blue indicator that changes color by UV light can be added to the accelerator component up to 5% by weight indicator to accelerator component so that the light blue lines disappear and the two components of the rapid set or quick dry system are completely blue in color. The excess indicator facilitates the destabilization of the system so that the water is expelled even faster from the system causing the coating and or material to cure and or dry faster. The disclosed indicator process can be used in very low pH solutions, coatings and the like and is not dependent on high pH levels, viscosity and the like unlike a pH changing indicator as described by Rosekelly, et al in US patent 2005/0143505 A1.

The disclosed indicator process can be used for example in coatings, paints, caulks, mastics and the like where the pH of the material is well below neutral and even below a pH of 4.0 and has multiple advantages including being able to apply more rapid set or quick dry material at a thicker loading over the current systems and indicators used for like purposes in the coating industry.

It has been found that the spray equipment that uses pressurized air delivery has significant flaws and better equipment is needed for the two components of a rapid set or quick dry system. An existing spray gun uses air pressure from an air compressor to deliver and or supply the two components of a rapid set or quick dry system from the containers holding these materials, through the hoses attached to the equipment and through the spray gun with two nozzles that limits the length of the hoses that can be used and therefore the distance the material can be sprayed vertically.

Another issue that is common in the industry that has remained unsolved when using equipment that relies on an air compressor to move material like the two components of a rapid set or quick dry system is that the surface of the wet applied coating, caulk, mastic and the like and eventually the dry coating after curing is rough and uneven so that dirt, soot, contaminates, water and the like are frequently trapped in these pits and voids causing the coating to often loose solar reflectivity and emissivity.

Yet another issue with the compressor type spray equipment when using a rapid set and or quick dry two component system is that air can be trapped in the coating that can reduce the tensile strength and elongation of the dry or cured coating. These air pockets or bubbles can also cause water swelling reducing the longevity of the coating.

A significantly better option is disclosed to deliver the two components of a rapid set or quick dry system from the containers holding these materials, through the hoses attached to the equipment, and through the spray gun to be comingled and cured during application to a surface. This discovery is unique for existing airless spray equipment so that they can be used to overcome the issues presented previously in this document to deliver and or supply the two components of a rapid set process.

But existing cospray airless spray equipment typically has issues that need overcoming in order for this type of equipment to be used for applying the disclosed two components of a rapid set process. The existing equipment can cause water swelling.

There are several airless sprayers used in the industry today. GRAYCO USA, and CJ Spray Inc. are two examples of manufacturers of airless spray equipment that can apply acrylic coatings, polyuria, urethane, silicone, foam, mastics and the like to name a few to external surfaces. The equipment designed off the shelf to apply commercial acrylic coatings and the like use high pressure to transport the material from the containers through the hoses and through the nozzles of the spray gun to be intermingled and mixed during application. This pressure of the equipment used today in the industry can range from 2000-4500 pounds per square inch (psi) or more. The minimum air pressure these models need to have a complete fan pattern on the spray gun nozzle depends on the tip and output required but the minimum pressure range is typically between 1500-3000 psi.

Existing airless equipment with the high pressure output does not work well for the disclosed rapid set and or quick dry two component acrylic systems. The high pressure causes a chemical change to the components especially the acrylic component. It is not unusual for a professional painter to use this type of high pressure equipment when using standard acrylic based polymeric coatings to paint or coat a wall, ceiling, floor, or the like. Unfortunately the professional painter after painting the majority of the surfaces must now spray additional acrylic material through the high pressure equipment often into a separate container like a 5 gallon pail for example for touch up and or detail painting and the like in order to match the sheen, gloss etc. of the high pressure spray applied acrylic coating.

The high pressure of the polymeric resin component in the airless sprayers, particularly the airless spray equipment used by professional contractors causes a problem with the application of the rapid set and or quick dry two component acrylic systems in the marketplace today. The high pressure used by the airless spray equipment changes the rheological properties of the acrylic polymeric resin component by causing the material to shear during high pressure application. The shearing effect causes the emulsion to break down and separate during application. Once the acrylic polymeric component breaks apart it can no longer function as indented and film formation is no longer possible thus causing the system to fail completely.

It was discovered that modifying an existing airless sprayer, achieved the desired application rates and finished film formation results. It has been proved that when using the modified airless sprayer equipment not only is the wet coating surface and ultimately the dry coating surface after curing and drying significantly smoother but also the modified spray equipment can deliver and supply the two components of a rapid set or quick dry system from the containers holding these materials, through the hoses attached to the equipment and through the modified spray gun with two nozzles three hundred (300) feet or more vertically from the ground level without losing application rate or performance of the cured polymeric coating.

A reduction in pressure was needed so that the equipment would not shear or breakdown the acrylic and or polymeric component of a rapid set or quick dry two component system. This innovation may sound easy but it took numerous trials and experiments to perfect the invention and was done by modifying at least one existing part of the existing spray equipment. One of the parts modified controlled how much pressure is used for the airless sprayer to operate and apply the polymeric resin component so that instead of 1500-3000 psi or more being used as is typical in standard off the shelf airless spray equipment only 500-900 psi is used to supply the resin to the cospray gun and 40-100 psi is used to supply the accelerator to the cospray gun to efficiently intermingle and mix the two components for fast drying and rapid setting of the coating. It was found that at this substantially lower pressure range the material performed as indented, adhered well to the substrate, cured with reduced voids and air pockets, and formed a good film rapidly with properties that met ASTM D6083 Type II standards.

By reducing the pressure of the polymeric resin component to be in the range between 500-1000 psi, and preferably in the range between 600 and 900 psi the two component rapid set and or quick dry two component acrylic and or polymeric resin component systems can now be applied significantly smoother and with better physical properties than previous equipment used for the same purpose.

The spray gun used in either the air spray systems or the airless spray system is critical and an important piece to the performance of the equipment. The typical spray gun mentioned uses a conventional side by side two nozzle overlapping fan pattern approach for spraying and intermingling the two components of a rapid set or quick cure system. Adjusting or having the proper nozzles or nozzle configuration on any spray equipment is critical to providing good overlap and intermingling of the two components of cured two component system like the rapid set or quick dry acrylic polymeric system and the like. Changing and adjusting the nozzles to ensure good overlap and intermingling of the two components can be time consuming and problematic. It has been found that the modifications to the angle where the resin component and accelerator component intermingle and mix during application enhances the performance of the spray gun in conjunction with the use of the correct spray tips. These changes made to the cospray spray gun allows the user/applicator enhanced flexibility and better performance.

Typical existing spray nozzles tips form a fan pattern that overlap and this is how the two components of a rapid set or quick dry coating system intermingle and mix during application.

It is important to note that the disclosed spray gun configuration differs considerably from the existing air powered compressor spray guns for the cospray rapid set or quick dry acrylic systems patented by Harco and Brinks. The disclosed airless spray gun configuration shown on FIGS. 1, 2, and 6 assures good mixing and intermingling of components due to the orientation of the two spray heads.

One of the features of the disclosed spray gun equipment includes a tool to adjust the angle of the catalyst pipe or supply line nozzle at an angle between 90 and 165 degrees in relationship to the resin component spray tip. This adjustable catalyst pipe or supply line oriented to a preferred angle range between 135 to 160 degrees insures that there is good mixing and intermingling of the polymeric resin component and the accelerator component of the two component system.

Choosing the proper spray tips is also important to the invention and innovations in using reduce pressure airless equipment. Using the wrong spray tips can cause incomplete mixing and intermingling of components as well as a rough surface appearance that can trap dirt, soot, ashes, and the like reducing the coatings reflectivity and emissivity. It has been found that using RAC 5 (Revers-A-Clean fifth version) spray tips for example allows the user/applicator to clean the tip by reversing the flow of material.

Table 2 shows experiments using the disclosed low pressure spray equipment at a fixed pressure for each of the components, 800 psi for the coating or polymeric resin component and 60 psi for the accelerator component. The higher the numerical rating in the "Notes" column the better the spray tip combination at the pressure indicated in Table 2.

It should be noted that manufactures of spray tips often use a code for their spray tips. For example for the 539 spray tip, the width of the fan pattern in inches is found by multiplying the first number "5" in our example by 2, so that the fan width pattern produced would be 10 inches wide when the spray gun is held 12-18 inches off the surface being sprayed. The second set of numbers "39" in our example is the orifice size stated in thousands of an inch or in this case equal to 0.039 inches.

The disclosed cospray gun shown on FIGS. 1, 2, and 6 allows the user/applicator the ability to quickly change the amount of material applied by increasing or decreasing the nozzle tip size that supplies the resin component on the spray gun equipment without making other adjustments to the equipment so that a lesser loading or higher loading of two component material can be applied at the desired gallons per square foot. The gallons per square foot can range from 1 to 4 gallons per 100 square feet at the lessor range using one of the nozzles and 3 to 6 gallons per 100 square feet using the higher loading nozzle.

The disclosed cospray spray gun gives the applicator the ability to adjust the accelerator amount injected into and intermingled with the resin component stream by adjusting the angle of the accelerator nozzle using the adjustment tool and by adjusting the nozzle tip size and or pressure that supplies the accelerator and or resin component on the spray gun equipment to accelerate the set time or decelerate the set time of the rapid set or quick cure system that is unique to the airless spray equipment.

These extraordinary results are achieved because air sprayers are significantly different from airless spray equipment even before modification because the air sprayers have to be connected to an air supply, which usually means a bulky, expensive air compressor.

Airless sprayers with the cospray spray gun use pressured streams of materials for instance coatings, mastics, caulks, paint, stain or the like that do not rely on air flow to force the material out of the sprayer, making them extremely portable and powerful. Since air sprayers have to be connected to a bulky expensive air compressor, the portability of this type of equipment is equal to the portability of the air compressor or lengths of high-pressure air hoses.

The airless spray equipment can pump directly from the container and these containers can be attached to the airless sprayer itself, allowing the modified low pressure airless sprayer to go anywhere if desired. Another advantage when using the disclosed low pressure airless sprayer is the surface finish. When using an air sprayer a stream of air is forced through the sprayer from the compressor that pushes the material out of the sprayer nozzle. This forms a low-pressure spray that is easy to layer but can possibly mix with air and cause paint bubbles or other blemishes in the coating finish and or applied material surface. Airless sprayers like the disclosed low pressure cospray equipment eliminate the chance of air mixing with the coating, mastic, caulk, paint, stain, sealant, or the like and provide a smoother finish and or smoother surface than when air sprayers are used for the same purpose.

It has also been discovered that when using the disclosed lower pressure airless cospray equipment with the disclosed cospray spray gun that a heavier wet and ultimately dry coating thickness is achieved so that up to 6 gallons or more per 100 square feet can be applied not only with one hose and one cospray spray gun but when also using two hoses and two cospray spray guns thus reducing the time it takes to finish a job, particularly a roof surface with penetrations, air ducts, air conditioners and the like up to 300 feet or more horizontally or vertically from ground level without issues.

The cospray gun 2 shown on FIG. 1 includes a stationary resin component spray nozzle 3 with connected resin component pipe 4, and an accelerator spray nozzle 5 fitted on adjustable accelerator pipe 6, accelerator spray nozzle 5 is adjustable. For example on FIG. 1 angel 20 is an approximate 120 degrees between the resin spray nozzle 3 and the accelerator spray nozzle 5. This angle 20 allows the user 1 to achieve excellent mixing and intermingling of the resin spray 7 with accelerator component spray 8 during spray application.

Resin hose/pipe 16 and accelerator hose/pipe 6 are shown on FIG. 2. An angle adjustment tool 9 is also shown on FIG. 2 for adjustment by a user 1 of the angle between the resin spray nozzle 3 and the accelerator spray nozzle 5.

The appearance of blue lines 11 on top of rapid set coating 10 at the edge of rapid set coating overlap area 13 as shown on FIG. 3 during spray application provides visual confirmation that the ratio of accelerator to resin is at the proper level. The appearance on FIG. 4 of dark blue splotches 12 on top of rapid set coating 10 at the edge of rapid set coating overlap area 13 during spray application provides visually evidence that the ratio of accelerator to resin is too high and too much accelerator is being used in the system.

An example of a typical accelerator container 14, accelerator siphon tube 19, accelerator component with blue indicator 8 and see through accelerator hose 15 filled with accelerator component with blue indicator 8 are shown on FIG. 5.

FIG. 6 shows a user/applicator 1 using cospray gun 2 spraying accelerator component with blue indicator 8 and liquid resin component 7 on top of primer coat 17 onto roof surface 18. The accelerator component with blue indicator 8 and liquid resin component 7 are intermingling at the proper ratio to form faint blue lines 11 on top of rapid set coating 10 at the edge of rapid set coating overlap area 13.

The disclosed system/process using the airless spray equipment modified to the lower pressures allows for a smoother surface profile that enhances the reflectivity of the applied rapid set coating over conventional rapid set coatings by about 12%. Typical rapid set coatings in the market today have a rougher surface profile with an average total solar reflectance (TSR) of 80.8% while the disclosed system/process has an average TSR of about 90.3%. The higher the TSR the more energy efficient the roof coating is in reducing heat transfer inside the structure that reduces the carbon footprint and saves money as is well known in the art.

Another advantage to the disclosed airless spray equipment is that one or more mixers that have variable speed controllers to adjust the mix speed and torque can be added to the equipment. These mixers can be used to mix the indicator preferably into the accelerator component and to keep the pigments, additives, fillers and the like from separating and or settling out of the resin component during application. The mixer can also fit conveniently in the bung hole of a 55 gallon drum or the like to keep the resin component mixing prior to and during use as it is always a best practice to keep the fillers, pigments and other additives thoroughly mixed and dispersed in solution prior to and during use for best application results.

It is also important to monitor how much material is being applied by the applicator to make sure that the mastic, caulk, coating, adhesive, or the like will function as intended. For roofs and similar structures that require the building to be water tight particularly commercial buildings that do not shed water as sloped residential buildings do, the quantity of material applied is essential for warranties and for the coating to protect the roof to keep the elements like snow, water and the like from entering the structure.

Today there is no good way that the building owner or maker of the material that often supplies the warranty for the coating, mastic, caulk and the like to know if the proper amount of material was applied by the applicator other than to travel to the job site and take roof cuts to measure the thickness of the material applied and or measuring the amount by weight of material per square area to ascertain if the proper thickness and amount of material has been applied. This is time consuming and can be expensive as the roof must be repaired where the roof cuts were made to measure the amount and or thickness of material that was applied in order to issue a warranty.

An example of the disclosed rapid set system/process set-up and application instructions that uses a gas fueled reduced pressure airless spray equipment is outlined below:

AIRLESS PUMP/ENGINE START-UP GENERAL PROCEDURES:
1) Turn the gas engine ON/OFF switch to "ON"
2) Turn fuel valve to "ON"
3) Turn Choke to "ON"
4) Insure all pump fluid valves are in the off position
5) Turn pump pressure dial, counter clockwise to zero pressure
6) Turn compressor dial to the "start" position
7) Set throttle to 100%
8) Pull cord until motor starts
9) Turn Choke to "OFF"

Liquid Resin Component Mixing Procedure:
1) Turn the compressor knob to the "RUN" position on the equipment.
2) Adjust the compressor pressure to a reading between 40 and 100 pounds per square inch (PSI) starting at an initial setting of 80 PSI.
3) Insert the mixer auger with optional liquid resin component siphon tube attached near the center of the liquid resin component that is typically inside a 55 gallon drum keeping the auger away from the sidewalls of the drum.
4) Attach the air hose to accelerator pump and mixer.
5) Adjust the mixer auger speed control knob to an appropriate speed (RPM) to maintain a slight vortex in the liquid resin component inside the drum keeping the RPM of the mixer auger at a speed that also prevents air from mixing into the liquid resin component.
6) Maintain this auger speed inside the drum for a minimum of 10 minutes to insure that the liquid resin component is thoroughly mixed to a homogeneous smooth white consistency.
7) Insert a liquid resin component siphon tube into the freshly mixed liquid resin component that has been thoroughly mixed inside the drum only if the auger used to mix the liquid resin component inside the drum does not contain a previously attached liquid resin component siphon tube.

Accelerator with Blue Indicator Set-Up Procedure:
1) Remove the accelerator tip from the cospray gun.
2) Attach the flexible mesh strainer onto the rim of an empty clean uncontaminated container. A clean empty 5 gallon bucket or pail that is new or that has only been previously used for this purpose is recommended.
3) Pour the liquid accelerator with blue indicator component through the strainer to fill the bucket to the desired level.
4) Remove the mesh strainer from the rim of the container and clean the strainer as needed.
5) Insert the accelerator siphon tube into the strained liquid accelerator with blue indicator component inside the container.
5) Turn the accelerator valve to the position marked "prime" on the equipment.
6) Watch the see-through siphon tube to insure that a constant stream of liquid accelerator with blue indicator is flowing through the tube and that any and all air bubbles are purged from the flowing strained liquid accelerator with blue indicator component.
7) Once the air bubbles are purged from the liquid accelerator with blue indicator component turn the accelerator valve to "spray" on the equipment and insure that the in-line valve at accelerator pump is open.
8) Adjust the pressure of accelerator pump between 40 and 100 PSI starting at an initial setting of 80 PSI.
9) Position cospray gun over an empty five gallon bucket or similar container so that accelerator nozzle is inside the bucket and pull the trigger on the gun and allow pump to fill the spray line with the liquid accelerator with blue indicator component. This typically takes approximately 1.5 gallons per 200 feet of hose length.
10) Install appropriate accelerator tip to nozzle and insure that Teflon tape is wrapped around the threads of the tip before inserting. Typically a 9501 nozzle tip is used to apply the accelerator with blue indicator component for all curb flashings, wall flashings, penetrations etc. and typically a 9502 nozzle tip is used to apply the accelerator with blue indicator component to the roof field.

(Tip sizes may vary depending on usage rate, coverage rate, and climatic conditions.)

11) Adjust and align accelerator tip so that the fan pattern produced by the liquid accelerator with blue indicator component intersects the liquid resin component spray tip at an angle between 90 and 165 degrees, a preferred angle is about 120 degrees.

12) Be careful not to cross contaminate the liquid accelerator with blue indicator component with liquid resin component.

Liquid Resin Component Set-Up Procedure:

1) Remove the liquid resin component spray tip housing guard from the cospray gun.
2) Insert a liquid resin component siphon tube into the 55 gallon drum containing the freshly mixed liquid resin component if the auger used to mix the liquid resin component inside the drum does not contain a previously attached liquid resin component siphon tube.
3) Insure that the liquid resin component spray pump pressure is completely off by turning the pressure control knob counter-clockwise.
4) Completely open pump valve and appropriate hose in-line valves.
5) Pull cospray gun trigger and slowly increase liquid resin component pump pressure until material flows out to produce the appropriate fan pattern.
6) Position cospray gun over an empty five gallon bucket or similar container so that liquid accelerator nozzle tip is outside the container and slowly pull the cospray gun trigger to allow the liquid resin component pump to fill spray line. This typically takes approximately 2.5 gallons per 200 feet of hose length.
7) Install appropriate coating tip as per manufacturer's instructions. Typically a 541 RAC nozzle tip is used to apply the liquid resin component for all curb flashings, wall flashings, penetrations etc. and typically a 547 RAC nozzle tip is used to apply the liquid resin component to the roof field. (Tip sizes may vary depending on usage rate, coverage rate, and climatic conditions.)
8) Align tip housing so fan is vertically in line with cospray gun.
9) Turn pressure control knob clock-wise to a spray pressure between 500 and 1000 PSI with a recommended starting pressure of 900 PSI.

Two Component Rapid Spray System Application Procedure:

1) Pull the cospray gun and hoses onto the roof being careful not to tie rope to cospray gun. The rope should be secured to a hose behind the cospray gun.
2) Stretch spray hose and cospray gun to farthest point of roof. Be careful not to pull on cospray gun to stretch hoses, pull on hoses only.
3) Turn pump pressure valve to the "ON" position
4) Spray a test pattern using the liquid resin component at a pressure between 500 and 1000 PSI with a recommended starting pressure of 900 PSI with the pressure of the accelerator pump between 40 and 100 PSI starting at an initial setting of 80 PSI to insure that the liquid resin component and accelerator component with blue indicator is at the proper ratio and there is complete mixing of the two components.
5) Align the nozzle tips as necessary to make sure the accelerator component with blue indicator mixes with the liquid resin component completely so that the fan pattern produced by the liquid accelerator with blue indicator component intersects the liquid resin component spray tip at an angle between 90 and 165 degrees, a preferred angle is about 120 degrees.
6) The accelerator nozzle tip should be located about 1.5 inches to 3.5 inches away from the fixed liquid resin component for best results.
7) The liquid accelerator with blue indicator component also called the liquid tinted accelerator component should be applied through the cospray gun at a ratio of 8-12 parts liquid resin component to 0.8-1.2 parts liquid tinted accelerator component. A preferred applied cospray ratio is 10 parts liquid resin component to 1 part liquid tinted accelerator component when using the cospray gun with the adjustable liquid tinted accelerator pipe fitted with the liquid tinted accelerator component nozzle tip at an angle between 90 and 165 degrees to the liquid resin component nozzle tip. A preferred angle of incidence of the tinted liquid accelerator fan to the fixed liquid resin component fan is about 120 degrees.
8) The liquid resin tip size and pressure setting and or liquid tinted accelerator pressure setting may have to be adjusted in order to meet the recommended applied cospray ratio of 8-12 parts liquid resin component to 0.8-1.2 parts liquid tinted accelerator component or the preferred ratio of 10 parts of liquid resin component to 1 part liquid tinted accelerator component.
9) After spraying the test section, look for faint blue lines that form at the intersection of the overlap areas to indicate the proper ratio of accelerator component with blue indicator to liquid resin component is achieved.
10) Dark blue splotches that occur at the overlap areas indicate that there is too much accelerator component being used in the system. Adjust the ratio of liquid resin component to accelerator component with blue indicator if needed by adjusting the pressures of the two components within the recommended ranges and if needed depending on environmental circumstances, change the liquid resin tip as needed. Also if needed, adjust the angle of the adjustable accelerator nozzle tip to ensure proper mixing of the two components.
11) Spray another test section as needed and adjust as necessary.
12) Spray a vertical test area with the two component rapid set system at a 55 wet mil thickness to confirm good vertical hold with no slumping after the pressures of the 2 components are adjusted if needed and after. A 55 wet mil thickness will give a dry mil thickness of about 32 mils. This dry mil thickness is typically about 15% more when using the 2 component rapid set system described here as compared to a standard elastomeric coating that takes multiple passes over several days to build the proper coating thickness to protect the roof and flashing details.
13) The 2 component rapid set system is meant to be applied as a monolithic and homogenous one time application at a thickness required to protect the roof and building typically at a wet mil thickness between 28 and 100 mils so that the applied finished coating is completed at time of application.
14) Check the wet mil thickness to make sure that the material is being applied at the correct rate recommended by the manufacturer.
15) Apply the two component rapid set system to all curb flashings, wall flashings, penetrations, etc. by moving the cospray gun back and forth while spraying with a cospray gun utilizing typically a 541 RAC nozzle tip for the liquid resin component paired with 9501 nozzle tip for the liquid accelerator with blue indicator component at a ratio of 8-12 parts liquid resin component to 0.8-1.2 parts liquid tinted accelerator component. A preferred ratio is 10 parts liquid resin component to 1 part liquid tinted accelerator component when using the cospray gun with the adjustable liquid tinted accelerator pipe fitted with the liquid tinted accelerator component nozzle tip at an angle between 90 and 165 degrees to the liquid resin component nozzle tip. A preferred angle of incidence of the tinted liquid accelerator fan to the fixed liquid resin component fan is about 120 degrees.

16) The liquid resin tip size and pressure setting and or liquid tinted accelerator pressure setting may have to be adjusted in order to meet the recommended ratio of 8-12 parts liquid resin component to 0.8-1.2 parts liquid tinted accelerator component or the preferred ratio of 10 parts of liquid resin component to 1 part liquid tinted accelerator component.

17) The applicator will typically apply the 2 part rapid set system detailed here by first selecting an area of the curb flashings, wall flashings, penetrations, etc. furthest from the spray equipment and or roof access on the roof for example and using the adjustable liquid accelerator spray tip cospray gun, makes an initial pass in a right to left or left to right motion and vice versa, so that the initial pass consists of two spray applications of the 2 component rapid set coating material.

18) The applicator will continue to spray the 2 component rapid set coating material so that each subsequent spray pass will have approximately a 50% overlap with the previous applied 2 component rapid set coating material.

19) The applicator will usually only make a double pass of the 2 component rapid set coating at the beginning and end of the selected area of application for the curb flashings, wall flashings, penetrations, etc. and all other spray passes in between utilize a 50% overlap with the previous applied 2 component rapid set coating material. This 50% overlap area is often referred to a half-lap in the industry.

20) Apply the two component rapid set system to roof field, with a cospray gun utilizing typically a 547 RAC nozzle tip for the liquid resin component that is paired with a 9502 liquid accelerator with blue indicator nozzle tip at a cospray applied ratio between of 8 to 12 parts liquid resin component to 0.8-1.2 parts liquid tinted accelerator component. A preferred applied ratio is 10 parts liquid resin component to 1 parts liquid tinted accelerator component when using the cospray gun with the adjustable liquid accelerator pipe fitted with the liquid tinted accelerator component nozzle tip at an angle between 90 and 165 degrees to the liquid resin component nozzle tip, a preferred angle is about 120 degrees. The liquid resin tip size and pressure setting and or liquid accelerator pressure setting may have to be adjusted in order to meet the preferred ratio of 10 parts of liquid resin component to 1 part liquid tinted accelerator component.

21) When spray applying the 2 component rapid set system, look for faint blue lines that form at the intersection of the overlap areas that indicate the proper ratio of the accelerator component with blue indicator to liquid resin component.

22) Dark blue splotches that occur at the overlap areas indicate that there is too much accelerator component being used in the 2 component rapid set system.

22) Adjust the ratio of liquid resin component to accelerator component with blue indicator if needed.

23) The applicator will typically apply the 2 part rapid set system disclosed by first selecting an area of the roof for example furthest away from the spray equipment and or the roof access and using the adjustable liquid accelerator spray tip cospray gun and making an initial pass in a right to left or left to right motion and vice versa, so that the initial pass consists of two spray applications of the 2 component rapid set coating material.

24) The applicator will continue to spray the 2 component rapid set coating material so that each subsequent spray pass will have approximately a 50% overlap with the previous applied 2 component rapid set coating material.

25) The applicator will usually only make a double pass of the 2 component rapid set coating at the beginning and end of the selected area(s) of application on the roof and all other spray passes in between utilize a 50% overlap with the previous applied 2 component rapid set coating material. This 50% overlap area is often referred to a half-lap in the industry.

26) For example, an applicator can apply the 2 component rapid set coating system by starting at one corner of the roof edge furthest away from the roof access and moving the cospray gun back and forth from about 1 to 1.5 times the applicators' shoulder width during spraying and walking slowly backwards until that section of the roof is covered leaving an area of the roof edge closest to the access point uncoated with material.

27) The applicator can turn perpendicular to the previous applied material and apply the 2 component rapid set coating material to the final section of roof edge.

28) The applicator then moves forward to begin spraying the next section of the roof in the same routine moving left to right on the roof or right to left on the roof and back and forth on the roof, etc. until the entire field of the roof is covered making sure each new section of roof being covered has an initial double application of the 2 component rapid set coating material and wherever the 2 component rapid set coating material overlaps either front or back or side to side it has a 50% overlap with the previous applied 2 component rapid set coating material.

29) The applicator is to end the spraying of the 2 component rapid set coating material at the roof access point making sure the final spray application consists of a double application with a 50% overlap with the previous applied 2 component rapid set coating material.

30) Another example an applicator can apply the 2 component rapid set coating system is by starting at one corner of the roof edge furthest away from the roof access and walking left to right or walking right to left as needed while holding and spraying the cospray gun in front and or to the side of the applicator with the cospray gun pointing toward the section of the roof edge furthest from the roof access point then reversing direction and walking back to the original starting point spraying the 2 component rapid set coating material the entire time so that the initial section of the roof has a double coverage of material.

31) The applicator steps back and proceeds to walk back and forth either left to right or right to left applying the 2 component rapid set coating material so that there is a 50% overlap of previously applied 2 component rapid set coating material in the field of the roof.

32) The applicator steps back and the process is repeated until almost the entire field of the roof is coated and there is one edge of the roof that is uncoated.

33) The applicator walks to the uncoated roof area away from the roof access point, turns perpendicular to the area of the roof already coated with the 2 component rapid set coating material and sprays the final section of roof starting away from the roof access by applying an initial double coat of 2 component rapid set coating material ensuring that there is a 50% overlap of previously applied 2 component rapid set coating material as needed and ending at the roof access point with a double layer of the 2 component rapid set coating material as the applicator exits the roof.

34) Clean and flush the equipment and hoses as recommended by the manufacturer.

Airless Pump/Engine Shut-Down:
1) Turn the gas engine ON/OFF switch to "OFF".
2) Turn fuel valve to "OFF" position.
3) Follow manufacturers' recommendations for moving and storing the equipment.

The two component rapid set system/process disclosed is intended to be applied to the substrate during a single application installation at a wet mil thickness of 28 to 100 mils that corresponds to about a 16 to 58 dry mil thickness as opposed to standard elastomeric coatings that need multiple coats to accomplish the same target film thickness applied over several days on the roof and flashing details since the elastomeric coating must be dry before additional coats can be applied. The dry mil thickness of the disclosed 2 component rapid set system/process is typically about 15% more as compared to a standard elastomeric coating used for the same purpose. The fact that an applicator can finish the job in typically one day instead of multiple days that are needed waiting for ordinary industry elastomeric coatings to dry and then recoat saves labor, time and money. Wet mil gauge tests should be made at the overlap thickness to make sure that the material is being applied at the correct rate recommended by the manufacturer.

One embodiment is a cospray gun comprising a resin nozzle with a supply line for a liquid resin component connected to the resin nozzle, an accelerator nozzle with a supply line for a tinted liquid accelerator component connected to the accelerator nozzle with the angle between the resin nozzle and the accelerator nozzle is adjustable.

Disclosed is a process for applying a rapid set aqueous coating comprising a liquid resin component and a liquid tinted accelerator component. Further to this process can be the selection of a cospray gun as disclosed in the embodiment above;
start an airless spray mechanism;
mix tinted liquid resin component;
setup accelerator component with a 0.1% to 10% color indicator;
select and install a tip on the accelerator spray gun nozzle;
adjust accelerator pressure to between 40 to 100 psi;
setup liquid resin component;
select and install coating tip on spray gun resin nozzle;
adjust resin pump pressure between 500 and 1000 psi;
align nozzle tips such that an accelerator component spray intersects a resin component spray at an angle between 90-165 degrees;
spray test pattern;
apply the accelerator and resin sprays at a ratio of 8-12 parts liquid resin component to 0.8-1.2 parts tinted liquid accelerator component;
check if lines of the tinted color indicator occur at the at an edge of rapid set coating overlap areas being applied; and
check if splotches of the tinted color indicator occur at the edge of rapid set coating overlap area indicting too much accelerator being applied, adjust pressure of the 2 components.

The above is a detailed description of particular embodiments of the invention. It is recognized that departures from the disclosed embodiments may be made within the scope of the invention and that obvious modifications will occur to a person skilled in the art. Those skilled in the art should, in light of the present disclosure, appreciate that many changes can be made in the specific embodiments which are disclosed herein and still obtain a like or similar result without departing from the spirit and scope of the invention. All of the embodiments disclosed and claimed herein can be made and executed without undue experimentation in light of the present disclosure.

We claim:

1. A cospray gun comprising:
    a liquid resin that is liquid and a resin;
    a liquid accelerator that is liquid and an accelerator;
    a resin nozzle;
    a resin supply line connected to the resin nozzle, wherein the resin supply line is configured to supply the liquid resin to the resin nozzle;
    an accelerator nozzle; and
    an accelerator supply line connected to the accelerator nozzle, wherein the accelerator supply line is configured to supply the liquid accelerator to the accelerator nozzle;
    wherein:
        an angle between the resin nozzle and the accelerator nozzle is adjustable,
        the cospray gun is an airless cospray gun that does not use air to pressurize the liquid resin through the resin supply line and does not use air to pressurize the liquid accelerator through the accelerator supply line,
        the resin nozzle and the accelerator nozzle are configured to intermingle and mix the liquid resin and the liquid accelerator external to the cospray gun, and
        the liquid accelerator is configured to, after intermingling and mixing of the liquid resin and the liquid accelerator, accelerate curing of the liquid resin.

2. The cospray gun according to claim 1, wherein an angle between the resin nozzle and the accelerator nozzle is set between 90 and 165 degrees.

3. The cospray gun according to claim 2, wherein the angle between the resin nozzle and the accelerator nozzle is set between 130 and 160 degrees.

4. The cospray gun according to claim 1, wherein the resin nozzle and the accelerator nozzle have replaceable tips, and the accelerator nozzle tip is located at a distance between 1.5 and 3.5 inches away from the resin nozzle tip.

5. The cospray gun according to claim 1, wherein the cospray gun is configured for use with a delivery system that supplies the liquid resin to the cospray gun at a pressure between 500-1000 psi for application.

6. The cospray gun according to claim 1, wherein the cospray gun is configured for use with a delivery system that supplies the liquid resin component to the cospray gun at a pressure between 700-900 psi for application.

7. The cospray gun according to claim 1, wherein the cospray gun is configured to supply the liquid resin and the liquid accelerator at a ratio between 8-12 parts liquid resin to 0.8-1.2 parts liquid accelerator through the cospray gun.

8. The cospray gun according to claim 1, wherein the cospray gun is an airless cospray gun configured for use with a delivery system that supplies the liquid resin to the cospray gun at a pressure between 500-1000 psi for application and supplies the liquid accelerator to the cospray gun at a pressure between 40-100 psi for application.

9. The cospray gun according to claim 1, wherein the cospray gun is an airless cospray gun configured for use with a delivery system that supplies the liquid resin to the cospray gun at a pressure between 500-1000 psi for application and supplies the liquid accelerator to the cospray gun at a pressure between 70-90 psi for application.

10. The cospray gun of claim 1, wherein the liquid accelerator is a colored liquid accelerator.

11. The cospray gun of claim 1, wherein the resin nozzle is a stationary resin nozzle, the accelerator nozzle is an adjustable accelerator nozzle, and the angle between the resin nozzle and the accelerator nozzle is adjusted by adjusting the adjustable accelerator nozzle relative to the stationary resin nozzle.

12. The cospray gun of claim 1, wherein only the resin supply line is connected to the resin nozzle, and only the accelerator supply line is connected to the accelerator nozzle.

13. The cospray gun of claim 1, wherein the resin nozzle is configured to spray the liquid resin, the accelerator nozzle is configured to spray the liquid accelerator, and the angle between the resin nozzle and the accelerator nozzle is configured to intermingle and mix the liquid resin and the liquid accelerator external to the cospray gun during application.

14. The cospray gun of claim 1, wherein the angle between the resin nozzle and the accelerator nozzle is adjustable while the resin supply line is connected to the resin nozzle and the accelerator supply line is connected to the accelerator nozzle.

15. A process for applying a rapid set aqueous coating comprising a liquid resin and a liquid accelerator, the process comprising:
   starting an airless spray mechanism;
   mixing the liquid resin;
   installing an accelerator tip on an accelerator nozzle of a spray gun, the spray gun comprising a resin nozzle, a resin supply line connected to the resin nozzle, the accelerator nozzle, and an accelerator supply line connected to the accelerator nozzle, wherein an angle between the resin nozzle and the accelerator nozzle is adjustable, the liquid resin is liquid and a resin, the liquid accelerator is liquid and an accelerator, the resin supply line is configured to supply the liquid resin to the resin nozzle, the accelerator supply line is configured to supply the liquid accelerator to the accelerator nozzle, and the cospray gun is an airless cospray gun that does not use air to pressurize the liquid resin through the resin supply line and does not use air to pressurize the liquid accelerator through the accelerator supply line;
   adjusting a pressure of the liquid accelerator to between 40 to 100 psi;
   installing a coating tip on the resin nozzle;
   adjusting a pressure of the liquid resin between 500 and 1000 psi; and
   aligning nozzle tips of the resin nozzle and the accelerator nozzle such that an accelerator spray intersects a resin spray at an angle between 90-165 degrees to intermingle and mix the liquid resin and the liquid accelerator external to the cospray gun, wherein, after intermingling and mixing of the liquid resin and the liquid accelerator, the liquid accelerator accelerates curing of the liquid resin.

16. The process for applying the rapid set aqueous coating according to claim 15, wherein the rapid set aqueous coating is monolithic and homogenous at a wet mil thickness between 28 and 100 mils at time of application.

17. The process for applying the rapid set aqueous coating according to claim 15, wherein the rapid set aqueous coating is monolithic and homogenous at a dry mil thickness between 16 and 58 mils after curing.

18. The process for applying the rapid set aqueous coating according to claim 15, wherein the rapid set aqueous coating has a smoother surface profile resulting in a 12% higher total solar reflectance.

19. The process for applying the rapid set aqueous coating according to claim 15, wherein the liquid resin and the liquid accelerator are sprayed at a ratio of 8-12 parts liquid resin to 0.8-1.2 parts liquid accelerator.

20. The process of claim 15, wherein the liquid accelerator is a tinted liquid accelerator.

21. The process for applying the rapid set aqueous coating according to claim 20, wherein the tinted liquid accelerator remains visible before and during application.

22. The process for applying the rapid set aqueous coating according to claim 20, wherein the tinted liquid accelerator fades from visibility during a curing cycle after application.

23. The process of claim 20, further comprising setting up the tinted liquid accelerator with a 0.1% to 10% tinted color indicator.

24. The process of claim 20, further comprising:
   spraying a test pattern;
   checking if lines of the tinted color indicator occur at the at an edge of rapid set coating overlap areas being applied; and
   checking if dark splotches of the tinted color indicator occur at the edge of rapid set coating overlap area indicate too much accelerator being applied and, if so, adjusting the pressures of the liquid resin and the tinted liquid accelerator.

25. A process for applying a rapid set aqueous coating comprising:
   starting an airless spray mechanism;
   adjusting an angle between a resin nozzle of an airless cospray gun and an accelerator nozzle of the cospray gun;
   using a resin supply line of the cospray gun to supply a liquid resin to the resin nozzle, wherein the resin supply line is connected to the resin nozzle, the liquid resin is liquid and a resin, and the cospray gun does not use air to pressurize the liquid resin through the resin supply line;
   using an accelerator supply line of the cospray gun to supply a liquid accelerator to the accelerator nozzle, wherein the accelerator supply line is connected to the accelerator nozzle, the liquid accelerator is liquid and an accelerator, and the cospray gun does not use air to pressurize the liquid accelerator through the accelerator supply line;
   using the resin nozzle and the accelerator nozzle to intermingle and mix the liquid resin and the liquid accelerator external to the cospray gun, and after intermingling and mixing of the liquid resin and the liquid accelerator, using the liquid accelerator to accelerate curing of the liquid resin.

26. The process of claim 25, wherein the resin nozzle is a stationary resin nozzle, the accelerator nozzle is an adjustable accelerator nozzle, and adjusting the angle between the resin nozzle and the accelerator nozzle comprises adjusting the adjustable accelerator nozzle relative to the stationary resin nozzle.

27. The process of claim 25, wherein adjusting the angle between the resin nozzle and the accelerator nozzle comprises adjusting the angle between the resin nozzle and the accelerator nozzle while the resin supply line is connected to the resin nozzle and the accelerator supply line is connected to the accelerator nozzle.

* * * * *